United States Patent
Stafeil et al.

(10) Patent No.: US 11,643,578 B2
(45) Date of Patent: May 9, 2023

(54) HOT MELT POSITIONING ADHESIVE

(71) Applicant: Bostik, Inc., Wauwatosa, WI (US)

(72) Inventors: Kevin Stafeil, Delafield, WI (US);
Kelley Gerschke, Brookfield, WI (US);
Kyle Gerarden, Wauwatosa, WI (US)

(73) Assignee: BOSTIK, INC., Wauwatosa, WI (US)

( * ) Notice: Subject to any disclaimer, the term of this patent is extended or adjusted under 35 U.S.C. 154(b) by 0 days.

(21) Appl. No.: 14/598,468

(22) Filed: Jan. 16, 2015

(65) Prior Publication Data

US 2015/0203725 A1    Jul. 23, 2015

Related U.S. Application Data

(60) Provisional application No. 61/965,043, filed on Jan. 17, 2014.

(51) Int. Cl.
*C09J 153/02* (2006.01)
*C08L 53/02* (2006.01)

(52) U.S. Cl.
CPC ............. *C09J 153/02* (2013.01); *C08L 53/02* (2013.01); *C08L 2205/02* (2013.01)

(58) Field of Classification Search
CPC ...... C09J 153/02; C08L 53/02; C08L 2205/02
See application file for complete search history.

(56) References Cited

U.S. PATENT DOCUMENTS

| | | | |
|---|---|---|---|
| 3,672,371 A | 6/1972 | Roeder | |
| 4,136,699 A | 1/1979 | Collins et al. | |
| 4,704,110 A | 11/1987 | Raykovitz et al. | |
| 5,149,741 A | 9/1992 | Alper et al. | |
| 5,868,727 A | 2/1999 | Barr et al. | |
| 5,869,562 A | 2/1999 | Lindquist et al. | |
| 6,025,071 A * | 2/2000 | Cameron | C08L 53/025 428/355 BL |
| 6,106,939 A | 8/2000 | Donker et al. | |
| 6,277,488 B1 | 8/2001 | Kobe et al. | |
| 6,384,138 B1 * | 5/2002 | Jacob | C09J 7/0221 525/89 |
| 6,465,557 B1 | 10/2002 | De Keyzer et al. | |
| 6,657,000 B1 | 12/2003 | De Keyzer et al. | |
| 7,199,180 B1 | 4/2007 | Simmons et al. | |
| 7,202,297 B2 | 4/2007 | De Keyzer et al. | |
| 7,754,327 B2 | 7/2010 | Kong | |
| 7,842,022 B2 | 11/2010 | Veglio et al. | |
| 2007/0117934 A1 | 5/2007 | He et al. | |
| 2008/0081858 A1 | 4/2008 | Okazaki | |
| 2011/0152436 A1 * | 6/2011 | Chan | C08L 53/02 524/505 |
| 2014/0056432 A1 | 2/2014 | Loui et al. | |

FOREIGN PATENT DOCUMENTS

| | | |
|---|---|---|
| EP | 1411100 A1 | 4/2004 |
| JP | 2000282006 A | 10/2000 |
| JP | 2011-162747 | 8/2011 |
| WO | 1999028405 A1 | 6/1999 |
| WO | WO 2012/006132 A2 | 1/2012 |
| WO | 2014189150 A1 | 11/2014 |

OTHER PUBLICATIONS

Machine translation of Yoneda et al (JP2000282006). (Year: 2000).*
Machine translation of Akagi et al (JP 2011162747). (Year: 2011).*
International Search Report of the ISA dated Mar. 26, 2015 issued in corresponding PCT Patent Application No. PCT/US2015/011719.
Written Opinion of the ISA dated Mar. 26, 2015 issued in corresponding PCT Patent Application No. PCT/US2015/011719.
Kasei, Asahi, "Styrene Butadiene Thermoplastic Elastomers SBS", NPR JP Pamphlet, Property Table of Asaprene T-439, pp. 1-4, Jun. 30, 2007.
Kim et al., "Shear Creep Resistance of Styrene-Isoprene-Styrene (SIS)-Based Hot-Melt Pressure-Sensitive Adhesives," Journal of Applied Science, Vo. 100, pp. 825-831 (2006).
Wang, C., Han, W., Tang, X. et al., "Evaluation of Drug Release Profile from Patches Based on Styrene-Isoprene-Styrene Block Copolymer: The Effect of Block Structure and Plasticizer." AAPS PharmSciTech No. 13, pp. 556-567 (2012).
Kraton Thermoplastic Training Manual, "Adhesives and Sealants" dated Apr. 24, 1994 and updated in Apr. 1996; p. 13.
Brochure: "Kraton D Polymers for use as an additive or a major formulating ingredient"; (no year provided).
McKay et al., "The Influence of Styrene-Butadiene Diblock Copolymer on Styrene-Butadience-Styrene Triblock Copolymer Viscoelastic Properties and Product Performance," Journal of Applied Polymer Science, vol. 56, 947-958 (1995).
Signed Letter for Arkema Jan. 10, 2023—KRATON 11107 as Referenced in JP2000282006(A) Norio Masuko, Principal Scientist, Kraton Innovation Center—Tsukuba.

* cited by examiner

*Primary Examiner* — Wenwen Cai
(74) *Attorney, Agent, or Firm* — Christopher R. Lewis

(57) ABSTRACT

A hot melt adhesive composed of a styrene-butadiene-styrene polymer having a relatively high diblock content and styrene content, a second styrenic block copolymer having a lower diblock content than the styrene-butadiene-styrene polymer, which is preferably a styrene-isoprene-styrene polymer, together with tackifying resin, and liquid plasticizer. The preferred styrene-butadiene-styrene polymer contains a styrene content of greater than 30 percent and a diblock content greater than 30 percent by weight. When used in conjunction with a styrene-isoprene-styrene polymer, the hot melt composition provides improved peel strength at 5° C., and when used as a pad attachment positioning adhesive, did not exhibit adhesive transfer at 40° C.

25 Claims, No Drawings

HOT MELT POSITIONING ADHESIVE

BACKGROUND OF THE INVENTION

The present invention relates to pressure sensitive hot melt adhesives, and more particularly to a hot melt positioning adhesive for use on feminine sanitary pads or adult incontinent products having improved peel values on cotton, nylon and microfiber substrates.

Hot melt adhesives have been used for many years in the construction of a wide variety of disposable nonwoven goods, such as disposable diapers, adult incontinent products and feminine care products. One specific application where pressure sensitive hot melts have traditionally been used is to adhere a feminine care article to a woman's undergarment. This requires a precise balance of adhesion properties to ensure the article is adhered so that it stays in place during use, but is also capable of being removed without leaving residue on or damaging the undergarment. Historically, these pressure sensitive hot melt adhesives have been formulated using styrenic block copolymers, typically styrene/ethylene-butylene/styrene (SEBS) or styrene/isoprene/styrene (SIS) block copolymers. These types of adhesives have been used commercially for many years.

Today's undergarment market, like many other Industries, is experiencing significant changes in both materials and design. Traditionally, many of the undergarments were manufactured utilizing fabrics that demonstrate similar characteristics across different regions of the world. Examples of these global standards include natural cotton and synthetic nylon. Currently, many areas are transitioning towards a variety of synthetic fabrics that exhibit very different characteristics. These characteristics are ultimately regionally specific, and are not consistent in properties between the various regions of the world.

To address comfort and fit, undergarment manufacturers are increasingly utilizing more synthetic fabrics with elongation characteristics, referred to as microfiber. The incorporation of microfiber into undergarments impart stretch, providing superior fit and enabling the growth of contoured shapes as seen in the market today. In addition, the use of microfibers in undergarment manufacture is gaining in popularity due to its ability to be conditioned with a variety of surface treatments. These treatments, for example, can improve the fabric's feel, wash/dry cycle durability, and its stain resistance. However, similar to the regional differences observed with synthetic fabrics between different undergarment manufacturers, the chemistry and the concentration of the surface treatments can also vary by region. The use of various microfiber substrates and the stretchability they impart, along with the surface additives that are used present a challenge for the adhesive formulator. It is difficult to make an adhesive that performs well across the wide variety of substrates, surface additives that are used and temperature ranges the adhesive might encounter. Today's manufacturers of feminine hygiene pads are also improving fit through pad shape as well as producing smaller, thinner, and more discrete pads in order to align with the wide range of undergarment designs currently available.

One exception to the trend, in regards to the transition to synthetic fabrics, would be the use of cotton for the gusset area in undergarments. Today, cotton is still the primary fabric used for the gusset area due to its moisture absorption properties and breathability characteristics. As a result, it appears unlikely that the gusset fabric will transition away entirely from cotton anytime in the near term. Therefore, it is very plausible, depending on the combination of undergarment design and the dimensions of the feminine hygiene pad, that the pad will be adhered to two very different substrates when positioned on an undergarment.

Furthermore, as feminine hygiene pad usage increases throughout the emerging markets of the world, pad attachment adhesives must not only provide consistent levels of peel on a variety of substrates, but must also perform at a wider range of temperatures. In many areas of the world, homes may not make use of central heating or cooling systems, causing the temperature of the environment to fluctuate more than in developed regions. A decrease in temperature can cause the adhesive on a feminine hygiene pad to lose surface tack, giving the consumer the sense that the adhesive is not working properly.

As the undergarment and the feminine hygiene markets evolve, adhesive manufacturers must develop new adhesives that address the variation in substrates and the reduction in surface area associated with the pad. Ultimately, there are three critical requirements that consumers demand of the pad attachment adhesive on feminine hygiene pad attachment applications. First, the adhesive must not transfer from the feminine hygiene pad to the undergarment during use. Second, the adhesive must provide the appropriate level of peel to remain in place during use, but must continue to be repositionable as needed. Third, the adhesive must, under no circumstances, result in substrate destruction of either the feminine hygiene pad or the undergarment.

The combination of smaller pad size, in conjunction with variable, more difficult to adhere to substrates, has led to inconsistent peel performance and more consumers questioning pad security.

There are many patents covering various formulating approaches that can be used to formulate adhesives for pad attachment applications. U.S. Pat. No. 4,136,699 discloses a hot melt adhesive for pad attachment using a styrenic block copolymer having an essentially saturated mid-block, a terpene tackifying resin and a mineral oil plasticizer. Typical examples of this type of polymer are those sold by Kraton Polymers under their Kraton G product line. It is very difficult to generate sufficient tack using this approach to bond well to microfiber fabrics and at low temperatures.

In U.S. Pat. No. 6,657,000 various formulations for a pad attachment adhesive are disclosed which use a blend of polymers. The polymer blend consists of (i) a hydrogenated styrene-(butadiene and/or isoprene)-styrene block copolymer with a styrene block copolymer number average molecular weight of between 9,500 and 20,000 along with (ii) a homogeneous linear interpolymer of ethylene and at least one $C_3$ to $C_{20}$ alpha olefin having a density of 0.85 to 0.91 grams per cubic centimeter. The total amount of the two polymers is from between 5 to 25 percent by weight of the total formula. In addition to the polymer blend, there is from 50 to 80 percent by weight of a tackifying resin having a particular level of aromaticity along with the remaining amount of the formulation comprising a plasticizing oil. This formulation approach would make it difficult to achieve the very high tack level needed to adhere to a microfiber garment. The polyolefin polymer has the effect of increasing the modulus and the glass transition temperature of the adhesive, both of which would tend to lower the tack level which is contrary to the present invention.

U.S. Pat. No. 7,842,022 discloses various pressure sensitive pad attachment adhesives that can be used on microfiber substrates. There are two approaches discussed in the patent to achieve the proper peel force. The first is the use of a silicone based pressure sensitive and the second is the use of two different adhesives instead of just one. For example, a conventional hot melt pressure sensitive adhesive would be used for bonding to cotton or nylon and a silicone based adhesive would be used to bond to the microfiber fabric. While conventional hot melts are mentioned in the patent, they are given as examples of adhesives "which are not capable to fulfill the peel force criterion on standard microfiber material according to the present invention" (column 7, lines 21-25). There is no guidance whatsoever on how to formulate a hot melt pressure sensitive adhesive that would perform on a microfiber substrate.

Therefore, a need exists for a new hot melt adhesive formulation that would perform well on microfiber substrates as well as on conventional cotton and nylon fabrics. In addition, it would be highly desirable if such an adhesive would have higher tack levels at low temperatures (e.g. 5°-10° C.) for use in geographies where central heating is not always available.

SUMMARY OF THE INVENTION

The invention provides formulations comprising a styrene-butadiene-styrene block copolymer (SBS) with a relatively high level of diblock, a second styrenic block copolymer with a lower level of diblock than the first SBS polymer, one or more tackifying resins, and a liquid plasticizer. These formulations have shown to provide improved peel values when compared to traditional pad attachment adhesives on cotton, nylon, and Pelicano (microfiber substrate) at room temperature (20° C. to 25° C.) as well as at low temperatures (0° C. to 5° C.). Applications include, but are not limited to, disposable gowns, baby diapers, adult incontinent products and feminine sanitary pads.

Accordingly, in one aspect, there is provided a hot melt adhesive composition, comprising;
 (a) About 2% to about 25% by weight of a first styrenic block copolymer (SBC) comprising a styrene-butadiene-styrene block polymer with a relatively high diblock content and styrene content, that is, a diblock content greater than 30% by weight and a styrene content greater than 30% by weight;
 (b) About 2% to about 25% by weight of a second styrenic block copolymer (SBC) which can have either an isoprene or butadiene midblock with a lower diblock content than the first SBC polymer;
 (c) About 25% to about 60% by weight of a tackifying resin, said tackifying resin present in an amount greater than the combined amount of the first and second styrenic block copolymers;
 (d) About 0% to about 15% by weight of an aromatic endblock reinforcing resin;
 (e) About 15% to about 50% by weight of a liquid plasticizer; and
 (f) About 0% to about 5% by weight of a stabilizer or antioxidant.

In another aspect, the first styrene-butadiene-styrene (SBS) polymer is present in the amount from about 2% to about 25% by weight, preferably from about 5% to about 20%, and most preferably from about 8% to about 16% by weight. The phrase "relatively high styrene content" when used in describing the first styrenic block copolymer means the styrene content of the first styrene-butadiene-styrene (SBS) polymer is preferably greater than 30% by weight, more preferably greater than 33% by weight and most preferably greater than 35% by weight, and up to about 50% by weight. The level of diblock must also be relatively high in the first SBS polymer. The phrase "relatively high diblock content" when used to describe the first SBS polymer means the level of diblock in the first styrene-butadiene-styrene (SBS) polymer should be greater than 30% by weight, more preferably greater than 45% by weight, and most preferably greater than 60% by weight, and up to about 70% by weight. The first styrene-butadiene-styrene (SBS) polymer preferably has a melt index greater than about 5 g/10 minutes and more preferably greater than about 8 g/10 minutes, and up to about 80 g/10 minutes, using ASTM D1238 (190° C./5 kg). The first styrene-butadiene-styrene (SBS) polymer should also have a solution viscosity (25% by weight in toluene) less than about 500 centipoise.

The preferred first styrene-butadiene-styrene (SBS) polymer is one having a styrene content of at least 35% by weight, a diblock content of at least 60% by weight, a melt index of at least 10 g/10 minutes as per ASTM D1238 (190° C./5 kg), and a solution viscosity (25% by weight in toluene) less than about 400 centipoise. A more preferred first styrene-butadiene-styrene (SBS) polymer is one having a styrene content of at least 40% by weight, a diblock content of at least 60% by weight, a melt index of at least 40 g/10 minutes as per ASTM D1238 (190° C./5 kg), and a solution viscosity (25% by weight in toluene) less than about 200 centipoise. The most preferred first styrene-butadiene-styrene (SBS) polymer is one having a styrene content of about 45% by weight, a diblock content of about 63% by weight, a melt index of about 50 g/10 minutes as per ASTM D1238 (190° C./5 kg), and a solution viscosity (25% by weight in toluene) of about 150 centipoise.

In yet another aspect, the second styrenic block copolymer is present in the amount from about 2% to about 25% by weight, preferably from about 5% to about 20%, and most preferably from about 8% to about 16% by weight. The midblock of the polymer can be butadiene, isoprene or butadiene/isoprene, but is preferably a styrene-isoprene-styrene (SIS) polymer. The styrene content of the polymer is preferably from 15% to 30% by weight, and more preferably from 15% to 25% by weight, or 15% to 20% by weight. If a diblock is present in the polymer, it should be kept to less than 50% by weight. More preferably, the diblock should be kept to less than 40% by weight, and most preferably less than 30% by weight. The second styrenic block copolymer preferably has a melt index greater than about 5 g/10 minutes, more preferably greater than about 8 g/10 minutes, and most preferably greater than about 10 g/10 minutes using ASTM D1238 (190° C./5 kg).

In still another aspect, the tackifying resin is selected from aliphatic and cyclo-aliphatic petroleum hydrocarbon resins, hydrogenated aliphatic and cyclo-aliphatic hydrocarbon resins, hydrogenated aromatic petroleum hydrocarbon resins, aliphatic/aromatic petroleum hydrocarbon resins, hydrogenated aliphatic/aromatic petroleum hydrocarbon resins, aromatic modified cyclo-aliphatic resins, and hydrogenated aromatic modified cyclo-aliphatic resins. The tackifying resin has a Ring & Ball Softening Point of greater than 100° C., more preferably higher than 115° C. and more preferably higher than 125° C. and is present in the range of about 25% to about 60% by weight.

In still another aspect, an endblock reinforcing resin may be present in the amount of about 0% or about 0.5% to about 15%, preferably from about 0% or about 0.5% to about 10%, and most preferred from about 0% or about 0.5% to about 5%.

In still another aspect, the plasticizer is present in the amount of about 15% to about 50% by weight, preferably in the amount of about 20% to about 45% by weight, and more preferably in the amount of about 25% to about 40% by weight. The preferred plasticizer is a liquid mineral oil.

In still another aspect, the glass transition (Tg) temperature of the hot melt adhesive, as determined by Dynamic Mechanical Analysis (DMA), is preferably at or below 15° C., more preferably below 10° C., and most preferably below 5° C.

In still another aspect, the peel value at 5° C. on cotton, nylon, and Pelicano (a microfiber substrate), as determined by the method described herein, is preferably equal to or greater than 1 Newton per inch width, and may be as high as 5 Newtons per inch width, at an add-on level of 25 gsm. The upper peel value limit is determined by the intended substrate since it is desired to ensure the article adheres and stays in place during use, but is also capable of being removed without leaving a transfer residue on or damaging the substrate.

Descriptions of the Substrates

For the purposes of this invention, cotton and nylon standards were purchased from Testfabrics, Inc at 415 Delaware Ave, West Pittston Pa., 18643. The cotton substrate was item number 437-W60, which is a bleached cotton t-shirt fabric with a basis weight of 124 grams per square meter. The nylon substrate used was item number 304 from Testfabrics, Inc. This is a nylon tricot fabric with a basis weight of 73 grams per square meter. Due to the requirement of low temperature performance in some emerging markets, Pelicano, a cotton-based microfiber from Intex S.A.S—Industrias Textil, was used. Pelicano is composed of 94% cotton, 6% elastane and was purchased from Intex S.A.S—Industrias Textil at Carrera 54A 79S-26, La Estrella Antioquia, Colombia.

DETAILED DESCRIPTION OF THE INVENTION

For many years, styrenic block copolymers have been widely used in formulating pressure sensitive adhesives for use in the manufacture of disposable gowns, diapers, and sanitary pads. Generally, formulators have not incorporated significant levels of diblock into hot melt adhesives used for feminine hygiene pad attachment applications, due the potential for adhesive transfer. For a given polymer, as the diblock content increases, the cohesive strength of the polymer decreases. This is because diblock has a styrene endblock on only one end of the molecule. It can be represented by the structure A-B, instead of the A-B-A structure in a tri-block polymer. In this representation, A represents the styrene endblock of the polymer and B represents the rubbery portion, which can be butadiene, isoprene, or a combination of butadiene and isoprene. If the polymer is hydrogenated, the midblock is typically ethylene/butylene although there are other possible structures. In a styrenic block copolymer, the styrene ends associate with one another to form a pseudo-crosslink. This is because the styrene and the midblock of the SBC are physically incompatible with one another. This contributes to better cohesive strength and elasticity when the polymer is at ambient conditions. Diblock has correspondingly lower strength and elasticity because the polymer is bound at one end instead of both. As styrenic block copolymer manufacturers continue to develop an ever wider assortment of polymers to the market, adhesive formulators have more options than ever before to address historical formulation deficiencies.

It has been discovered that the incorporation of a high styrene, high diblock styrene-butadiene-styrene polymer more efficiently reduces the internal strength of a hot melt adhesive, enabling more extension of the adhesive with the substrate before pulling away at low temperatures. This phenomenon allows for an adhesive that provides improved peel values between substrates with different elongation characteristics. Unlike high concentrations of traditional styrene-butadiene polymer diblock polymers, the addition of a high styrene, high diblock styrene-butadiene-styrene polymer did not exhibit an increased predisposition to transfer onto an undergarment during in-use testing.

Currently, there are a several grades of high styrene, high diblock styrene-butadiene-styrene polymers available from multiple suppliers, specifically LCY Chemical Corp., TSRC Corp., and Kraton Polymers. These polymers range from approximately 31% to 45% styrene content by weight. Melt index is determined according to ASTM D1238, using a 5 kilogram weight and a test temperature of 190° C. Under those conditions, these polymers have a melt index that range from about 5 g/10 minutes to about 50 g/10 minutes.

For the purposes of the present invention, the first styrenic block copolymer comprising the high styrene, high diblock styrene-butadiene-styrene (SBS) polymer is present in the amount of from about 2% to about 25% by weight, preferably from about 5% to about 20% by weight, and most preferably from about 8% to about 16% by weight. Its styrene content is preferably greater than 30% by weight, more preferably greater than 33% by weight, and most preferably greater than 35% by weight. The diblock content must be fairly high to promote the high peel strength needed at low temperatures and on microfiber substrates. It should be greater than 30% by weight, more preferably greater than 45% by weight, and most preferably greater than 60% by weight. The styrene-butadiene-styrene (SBS) polymer preferably has a melt index greater than about 5 g/10 minutes and more preferably greater than about 8 g/10 minutes.

Today's styrene-isoprene-styrene (SIS) based feminine hygiene pad attachment adhesives demonstrate a rheological profile with a very dominant rubbery plateau region. Earlier generations of feminine hygiene pad attachment adhesive, based on styrene-ethylene-butadiene-styrene (SEBS) technology, exhibited similar profiles. The dominant rubbery plateau region indicates that the adhesive will display a very strong elastic response, which translates into the adhesive's ability to resist transferring onto the undergarment during use.

In order to maintain the necessary rheological profile, a second styrenic block copolymer, specifically a relatively low styrene containing and relatively low diblock containing second styrenic block copolymer, needed to be incorporated. The second SBC polymer may include, but is not limited to, styrene-isoprene-styrene (SIS), styrene-butadiene-styrene (SBS), styrene-ethylene/butadiene-styrene (SEBS), styrene-[ethylene-(ethylene-propylene)]-styrene (SEEPS), and blends of these second styrenic block copolymers. With respect to the present invention, a styrene-isoprene-styrene (SIS) was the preferred secondary polymer due to the higher peel values that were obtained at 5° C.

Ideally, the adhesive should deliver the same performance whether it is bonded to a cotton, nylon or a microfiber substrate. Likewise, the adhesive should exhibit essentially the same bond strength if the ambient temperature is 5° C., 10° C., 20° C. or body temperature (37° C.). However, this is virtually impossible to achieve. What is possible is to formulate the adhesive so that it gives relatively similar performance under all these variables. Pad attachment adhesives sold today, such as those shown in Table 2, have very low peel strength on all the substrates tested at 5° C. To ensure that the pad stays in place after application, it is desirable to have a peel strength of greater than 1 Newton per inch width. If the peel strength is less than 1 Newton, the pad may not stay in place properly or in some cases may fall off entirely. During use, the bond strength will build over time. Equally important is that the adhesive not transfer to the undergarment or tear either the pad or the underwear when it is removed, and so a practical upper limit of peel strength is about 5 Newtons per inch width. As is evident from Table 2, none of the existing products meet those two criteria. However, all six of the inventive examples shown in Table 1 meet those criteria.

For the purposes of the present invention, the second styrenic block copolymer, which is preferably a styrene-isoprene-styrene (SIS) polymer, is present in the amount of about 2% to about 25% by weight, preferably from about 5% to about 20%, and most preferably from about 8% to about 16% by weight. Its styrene content is preferred from 15% to 30% by weight, more preferably from 15% to 25% by weight, and most preferably 15% to 18% by weight. If diblock is present in the polymer, it should be kept to less than 50% by weight, more preferably less than 30% by weight, and most preferably less than 18% by weight. The styrene-isoprene-styrene (SIS) polymer preferably has a melt index greater than about 5 g/10 minutes and more preferably greater than about 8 g/10 minutes using ASTM 1238 (190° C./5 kg). A styrene-butadiene-styrene polymer can also be used as the secondary polymer. However, as the total amount of SBS polymers increase in the formulation, the likelihood occurs that the finished adhesive formulation will become less thermally stable. Hot melt adhesives with high levels of SBS polymers in them can cross-link and gel after prolonged heat aging, for example 100 hours at 350° F. Caution must be used to ensure the proper antioxidant system be used to minimize the possibility of this occurring. Certain hydrogenated styrenic block copolymer can also be used but caution must be used to make sure the finished adhesive formulation is completely compatible.

In the case that additional internal strength is needed, a substantially aromatic endblock reinforcing resin may be incorporated in an amount from 0% to about 15% by weight. For the purposes of the present invention, and when utilized in the composition of the present invention, the endblock resin may be incorporated at an amount of about 0.2% to about 15% by weight, preferably from about 0.2% to about 10% by weight, and most preferred from about 0.2% to about 5% by weight. Examples of such end block resins can be prepared from any substantially aromatic monomers having a polymerizable unsaturated group. Typical examples of such aromatic monomers include the styrenic monomers, styrene, alphamethyl styrene, vinyl toluene, methoxy styrene, tertiary butyl styrene, chlorostyrene, coumarone, indene monomers including indene and methyl indene. The substantially aromatic endblock resin preferably has a Ring and Ball softening point between about 100° C. to about 160° C. More preferably, the endblock resin has a Ring and Ball softening point between about 100° C. to about 140° C., and most preferably between about 120° C. to about 140° C. Two preferred examples of endblock resins useful in the present composition are Plastolyn 240, which has a Ring and Ball softening point of 120° C., and Plastolyn 290, which has a Ring and ball softening point of 140° C. Both Plastolyn 240 and Plastolyn 290 are available from Eastman Chemical.

The adhesive in this invention contains a tackifying resin in combination with the styrene-butadiene-styrene (SBS) polymer, styrene-isoprene-styrene (SIS) polymer or other secondary polymer and liquid plasticizer. The tackifying resins are selected for a specific degree of compatibility with the polymers and plasticizer. Representative resins include (1) aliphatic petroleum hydrocarbons resins resulting from the polymerization of monomers consisting primarily of olefins and di-olefins; also included are the hydrogenated aliphatic hydrocarbon resins; and (2) cyclic petroleum hydrocarbon resins and the hydrogenated derivatives thereof; and (3) copolymers and terpolymers of natural terpenes; such as styrene/terpene and alpha methyl styrene/terpene and (4) fully or partially hydrogenated aromatic resins such as Regalrez 1126 and the Arkon M and P series resins. Mixtures of two or more of the above tackifying resins may be required for some formulations. If odor is not a concern, the typical tall oil rosin esters may be employed.

The tackifying resin should have a Ring and Ball softening point (measured by ASTM E28) of at least 100° C., preferably greater than 115° C. and most preferably equal to or greater than 130° C. A preferred tackifier is a hydrogenated aromatically modified dicyclopentadiene resin with a Ring and Ball softening point of 130° F., such as Escorez 5637. However, it is possible to achieve the desired softening point by blending a 115° C. and a 142° C. softening point resin together. For example, a blend of Escorez 5615 and Eastotac 142R could be used. Blending a more aromatic resin with another that has no appreciable aromatic content can be used to tailor not only the softening point but also the total degree of aromaticity in the resin system.

The tackifiers are present in the adhesive composition in an amount greater than the combined amount of the first and second styrenic block copolymers. The total amount of tackifying resin is present in amount of about 25% to about 60% by weight of the composition, preferably about 30% to about 55%, and most preferably about 35% to about 50% by weight. As previously stated, blends of two or more tackifying resins may also be used.

Hot melt formulations, according to the present invention, also contain about 15% to about 50%, preferably about 20% to about 45%, and most preferably about 25% to about 40%, by weight, of any plasticizer, which is a liquid at ambient temperature. A plasticizer is broadly defined as a typically organic composition that can be added to rubbers and other resins to improve extrudability, flexibility, workability, or stretchability. A suitable plasticizer may be selected from the group which not only includes the usual plasticizing oils, such as mineral oil, but also olefin oligomers and low molecular weight polymers, glycol benzoates, as well as vegetable and animal oils and derivatives of such oils. The petroleum-derived oils that may be employed are relatively high boiling temperature materials containing only a minor proportion of aromatic hydrocarbons. In this regard, the aromatic hydrocarbons should preferably be less than 30%, and more particularly less than 15%, by weight, of the oil. Preferably, the oil may be totally non-aromatic and severely hydrotreated.

The oligomers may be polypropylenes, polybutenes, hydrogenated polyisoprene, hydrogenated butadiene, or the like having average molecular weights between about 100 and about 10,000 g/mol. Suitable vegetable and animal oils include glycerol esters of the usual fatty acids and polymerization products thereof. Other plasticizers may be used provided they have suitable compatibility. Nyflex 222B, a naphthenic mineral oil manufactured by Nynas Corporation, has also been found to be an appropriate plasticizer. As will be appreciated, plasticizers have typically been employed to lower the viscosity of the overall adhesive composition without substantially decreasing the adhesive strength and/or the service temperature of the adhesive. The choice of plasticizer can be useful in formulation for specific end uses (such as wet strength core applications).

Since mineral oil is the least expensive component in the adhesive, it is desirable to have the percentage of oil in the product as high as possible. However, as the percentage increases, the possibility of the oil slowly exuding out of the product over time increases. Therefore, extreme care must be taken to ensure that doesn't happen. The finished hot melt should be aged at various temperatures over time and any presence of oil on the surface be noted. Generally, evidence of any oil coming out of the product at any temperature is unacceptable. It is surprising that none of the products shown in Table 1 exhibited this phenomenon. While it is known that fully hydrogenated block copolymers are capable of holding relatively high amounts of oil, this has not been the case with SBS and SIS block copolymers.

Hot melts of the present invention may also contain relatively small amounts of other auxiliary agents such as waxes, or other additives as long as they don't detract from the performance of the adhesive. Inorganic materials may also be incorporated if desired. For example, the usual dyes, pigments and fillers can be added to modify the color or appearance of the product. If they are present, the amount of such auxiliary agents will generally be below 10% by weight.

The adhesive typically includes a stabilizer or antioxidant which may be present in an amount of about 0% to about 5% by weight, and is preferably present in an amount of about 0.5% to about 5% by weight. The stabilizers which are useful in the hot melt adhesive compositions of the present invention are incorporated to help protect the adhesive components noted above, and thereby the total adhesive system, from the effects of thermal and oxidative degradation which normally occurs during the manufacture and application of the adhesive as well as in the ordinary exposure of the final product to the ambient environment. Such degradation is usually manifested by deterioration in the appearance, physical properties and performance characteristics of the adhesive. A particularly preferred antioxidant is Irganox 1010, a high molecular weight hindered phenolic antioxidant manufactured by BASF among others. Combinations of hindered phenolic antioxidants with other synergistic stabilizers, such as amines, thioesters and phosphites are frequently used in hot melt formulations.

The adhesive composition useful in the method of the present invention may be produced using any of the techniques known in the art. A representative example of the procedure involves placing all of the liquid substances in a jacketed mixing kettle and preferably in a jacketed heavy duty mixer of the Baker-Perkins or Day type, and which is equipped with rotors, and thereafter raising the temperature of this mixture to a range of 120° C. to 177° C. The solid tackifying resins and other additives are then added and melted to form a homogeneous mixture. Finally, the polymer is added and mixed until completely blended in. It should be understood that the precise temperature to be used in this step would depend on the melting point of the particular ingredients and the viscosity of the finished adhesive. The resulting adhesive composition is agitated until the polymers completely dissolve. A vacuum is then applied to remove any entrapped air.

The following materials were used:
1) Nyflex 222B is a severely hydrotreated napthenic process oil available from Nynas Corporation.
2) Escorez 5615 is a hydrogenated aromatic modified cycloaliphatic hydrocarbon resin with a Ring & Ball softening point of about 118° C. It is available from ExxonMobil Chemical Corp.
3) Escorez 5637 is a hydrogenated aromatic modified cycloaliphatic hydrocarbon resin with a R&B softening point of about 130° C. It is available from ExxonMobil Chemical Corp.
4) Eastotac H-142R is a hydrogenated hydrocarbon resin, having a Ring and Ball softening point of about 142° C. and a molten Gardner color of 4. It is available from Eastman Chemical Company.
5) Plastolyn 290 is an endblock reinforcing resin with a softening point of about 140° C.
It is available from Eastman Chemical Company.
6) Vector 4111A is a linear styrene-isoprene-styrene (SIS) block copolymer with 18% styrene content by weight and essentially zero diblock content. It has a melt index of 12 g/10 minutes as determined by ASTM D-1238 at 200° C./5 kg. The material is available from Dexco Polymer, a TRSC company.
7) Vector 4114A is a linear styrene-isoprene-styrene (SIS) block copolymer with 15% styrene content by weight and about 42% diblock content by weight. It has a melt index of 25 g/10 minutes as determined by ASTM D-1238 at 200° C./5 kg. The material is available from Dexco Polymer, a TRSC company.
8) Taipol 1307 is a linear styrene-butadiene-styrene (SBS) block copolymer with 16% styrene content by weight and approximately 18% diblock content by weight. It has a melt index of 8 g/10 minutes at 190° C./5 kg. The material is available from the TRSC Corporation.
9) Taipol 3206 is a linear styrene-butadiene-styrene (SBS) block copolymer with 29% styrene content by weight and approximately 18% diblock content by weight. It has a melt index of 5.5 g/10 minutes at 190° C./5 kg. The material is available from TRSC Corporation.
10) Taipol 4265 is a linear styrene-butadiene-styrene (SBS) block copolymer with 36% styrene content by weight and approximately 65% diblock content by weight. It has a melt index of 12 g/10 minutes at 190° C./5 kg, and a solution viscosity (25% by weight in toluene) of about 360 centipoise. The material is available from TRSC Corporation.
11) Globalprene 3545 is a linear styrene-butadiene-styrene (SBS) block copolymer with 45% styrene content by weight and approximately 63% diblock content by weight. It has a melt index of 50 g/45 minutes at 190° C./5 kg, and a solution viscosity (25% by weight in toluene) of about 150 centipoise. The material is available from LCY Elastomers LP.
12) Kraton D1124 is a radial styrene-isoprene-styrene (SIS) block copolymer with 30% styrene content by weight and about 29% diblock content by weight. It has a melt index of 4 g/10 minutes as determined by ASTM D-1238 at 200° C./5 kg. The material is available from Kraton Performance Polymers.
13) Irganox 1010 is a hindered phenol antioxidant. It is available from BASF Corporation.

Instrumental Characterization

Brookfield viscosity was tested according to ASTM D-3236 Method and is reported in centipoise (cP) units.

Dynamic Temperature Testing

The rheology of a given hot melt adhesive can be determined using a TA Instruments rheometer, such as an Ares 3 model. For the adhesives listed in the tables below, a temperature step procedure was used to determine the storage modulus, G', at various temperatures as well as the glass transition temperature, Tg. The instrument was set to a frequency of 10 radians per second and the temperature was varied from +140° C. to −40° C. The parallel plates used had a 25 millimeter diameter and a 1.6 millimeter gap.

Rheological analysis of the novel adhesive formulations, described in this invention, exhibits a distinct rubbery plateau from 20° C. to 92° C. and imparts a strong elastic response, despite various amounts of diblock being incorporated into the formula. The addition of a small amount of a traditional low styrene-butadiene (SB) diblock polymer, such as Solprene 1205, manifests itself in a significant drop in high temperature cross-over values (Tx) and results in adhesive transfer at 40° C. For the purpose of the present invention, a glass transition (Tg) is preferred at or below 15° C., more preferably below 10° C., and most preferred to be below 5° C. This provides a product that gives stronger peel strength at low temperatures than conventional pad attachment products shown in Table 2.

Test Methods

Low Temperature Peel Adhesion Testing

Cut 4.75 inch×2 inch [12.05 cm×5.08 cm] strips of fabric, whether it is cotton, nylon or Pelicano, with maximum fabric stretch in the cross direction. Cut 5 inch [12.70 cm] long strips of poly or non-woven/adhesive/release liner laminations. Allow fabric samples and adhesive coated poly to equilibrate at 5° C. for at least four hours. At temperature, combine with two passes (back and forth) with 4.5 lb [2.04 kg] rubber roller.

After preparation of 5 samples, peel adhesion tests should be run as quickly as possible. This testing protocol can be performed at a variety of environmental conditions with the assistance of an environmental chamber attachment for the Instron, a calibrated machine that is used to evaluate the mechanical properties of materials and components through tension, compression, flexure, fatigue, impact, torsion, and hardness tests. Set the Instron jaw spacing at 2 inches [5.08 cm]. The cross-head separation speed is 20 inches [50.8 cm] per minute. Place poly/release liner end in top jaw and cotton fabric end in bottom jaw. If testing on a nylon or microfiber substrate is desired, then a nylon or microfiber substrate should be substituted for the cotton fabric and placed in the bottom jaw of the Instron. Care should be taken that specimens are spaced at uniform distances between upper and lower jaws. Average peel value of 5 samples are measured and reported.

In Use Peel Testing

Fabric and hot melt adhesive laminations are prepared in a similar fashion to that of the peel adhesion testing protocol. Peel off release liner and fold approximately 2.5 inches [6.35 cm] of adhesive coated stock onto itself. Combine fabric and adhesive coated stock with no additional pressure, other than the weight of the fabric itself. Place test samples (fabric side up) onto an aluminum plate. Carefully place 250 gram brass block, 2 inches by 2 inches, on each sample. It is important to note that the aluminum plate and 250 gram brass blocks are pre-conditioned at oven test temperature.

Place aluminum plate with samples into oven at 105° F.+/−3° F. [41° C.+/−1.5° C.] for 16 hours. After 16 hours, remove plate from oven, remove weights, and set samples aside for peel value testing. It is important to note that samples should not be stacked during the cooling period. Allow 45 minutes for samples to equilibrate to room temperature before Instron peel testing is initiated. Maximum equilibration time is two hours.

The Instron set-up is the same fashion as in the low temperature peel testing protocol. The average peel value of 5 samples, the occurrence of adhesive transfer, the result of substrate destruct, or any combination of these can be reported. The testing protocol can be repeated, as necessary.

Elongation Testing

Cut a 4.75 inch×1 inch [12.05 cm×2.54 cm] strip of fabric, whether it is cotton, nylon, or microfiber, with maximum fabric stretch in the cross direction. Using a permanent marker, fill in a 1 inch square area on the fabric strip. Cut a 1 inch [2.54 cm] piece off of a wooden stirring stick, roll one end of the fabric around it, and staple it together. Once completed, use an alligator clip to fasten the fabric end, without the wooden stirring stick, onto a static shear station. Next, place an additional binder clip to the end, which has the wooden stirring stick stapled into the fabric, and hang a 500 gram weight. The incorporation of the wooden stirring stick stapled into the fabric will help prevent the alligator clip from sliding off under the load. After hanging the fabric, measure the extension that the 1 inch square area has expanded to when placed under the load. Then, determine the difference between these two measurements before dividing the difference by the original 1 inch in order to determine the percent elongation of the fabric currently being tested.

Performance Evaluation

Bond evaluations of the novel adhesive formulations described in this invention demonstrate increased peel values over traditional pad attachment adhesives at 5° C. The increase in peel strength at 5° C. does not come at the expense of adhesive transfer at 40° C. Table 1 shows several formulations, comprising of a blend of styrenic block copolymers, tackifying resin, and mineral oil. Physical properties, selected rheological data, peel values at 5° C., and data on adhesive transfer are included.

In Table 2, four prior art products are shown along with their physical properties. H2850 is a general purpose pressure sensitive adhesive (PSA) that utilizes a styrene-isoprene-styrene (SIS) polymer and a high plasticizer oil content. H20080 is a general purpose PSA that incorporates both a styrene-isoprene-styrene (SIS) polymer and a styrene-butadiene-styrene polymer. H5400 provides an example of a styrene-ethylene/butadiene-styrene (SEBS) based pad attachment adhesive. H20028 is a pad attachment adhesive, which is composed of a blend of SIS polymers. H2850, H20080, H5400 and H20028 are currently commercially available from Bostik, Inc. in Wauwatosa, Wis.

Table 3 details the different elongation characteristics of the substrates used in the peel testing.

TABLE 1

|  | Example 1 | Example 2 | Example 3 | Example 4 | Example 5 | Example 6 |
|---|---|---|---|---|---|---|
| Nyflex 222B | 36.5 | 36.5 | 36.5 | 32.6 | 36.5 | 36.5 |
| Escorez 5615 |  |  |  | 21.2 |  |  |
| Escorez 5637 | 42.6 | 42.6 | 42.6 |  |  | 42.6 |
| Estotac 142R |  |  |  | 21.5 | 36.8 |  |
| Plastolyn 290 |  |  |  |  | 2.1 |  |
| Vector 4111A |  | 5.6 |  |  |  | 4.4 |
| Vector 4114A |  | 4.7 |  |  |  |  |
| Taipol 1307 |  |  | 10.3 | 8 | 16.2 |  |
| Taipol 3206 | 10.3 |  |  |  |  |  |
| Tiapol 4265 |  |  |  |  |  | 10 |
| Globalprene 3545 | 10 | 10 | 10 | 16.2 | 8 |  |
| Kraton D1124 |  |  |  |  |  | 5.9 |
| Irganox 1010 | 0.6 | 0.6 | 0.6 | 0.5 | 0.4 | 0.6 |
| Viscosity @ 350° F. | 575 cP | 525 cP | 625 cP | 775 cP | 975 cP | 525 cP |
| Viscosity @ 325° F. | 850 cP | 800 cP | 875 cP | 1175 cP | 1500 cP | 750 cP |
| Viscosity @ 300° F. | 1375 cP | 1325 cP | 1425 cP | 2000 cP | 2850 cP | 1200 cP |
| R&B Softening Point | 192° F. | 185° F. | 186° F. | 194° F. | 193° F. | 190° F. |
| Tg (° C.) | 4.7 | 2.4 | 2.9 | 3.6 | −2.5 | 0.4 |
| G' @ 25° C. | $1.4 \times 10^5$ | $9.9 \times 10^4$ | $1.03 \times 10^5$ | $1.24 \times 10^5$ | $1.18 \times 10^5$ | $1.08 \times 10^5$ |
| Tx (° C.) | 88.7 | 82.2 | 86.1 | 88.5 | 91.2 | 86.6 |
| Adhesive Transfer at 40° C. | No | No | No | No | No | No |
| Peel on Pelicano 5° C. | 1.2N | 2.2N | 2.3N | 1.3N | 1.6N | 1.9N |
| Peel on Cotton 5° C. | 2.1N | 2.8N | 2.5N | 2.3N | 2.2N | 2.5N |
| Peel on Nylon 5° C. | 1.4N | 3.2N | 2.4N | 2.1N | 2.8N | 2.8N |

TABLE 2

|  | H2850 | H20080 | H5400 | H20028 |
|---|---|---|---|---|
| Viscosity @ 350° F. | 850 cP | 975 cP | 1100 cP | 740 cP |
| Viscosity @ 325° F. | 1050 cP | 1200 cP | 1400 cP | 1140 cP |
| Viscosity @ 300° F. | 1800 cP | 2100 cP | 3500 cP | 1865 cP |
| R&B Softening Point | 173° F. | 175° F. | 198° F. | 192° F. |
| Tg (° C.) | 16 | 19.2 | 16 | 12.8 |
| G' @ 25° C. | $1.69 \times 10^5$ | $4.79 \times 10^5$ | $3.15 \times 10^5$ | $2.26 \times 10^5$ |
| Tx (° C.) | 80.1 | 86 | 83.4 | 84.5 |
| Adhesive Transfer at 40° C. | Yes | Yes | No | No |
| Peel on Pelicano 5° C. (N) | 0.5N | 0.2N | 0.1N | 0.6N |
| Peel on Cotton 5° C. (N) | 0.8N | 0.5N | 0.4N | 1.2N |
| Peel on Nylon 5° C. (N) | 0.6N | 0.3N | 0.1N | 0.6N |

TABLE 3

| Pelicano | 87.50% |
|---|---|
| Cotton | 37.50% |
| Nylon | 12.50% |

We claim:

1. A hot melt adhesive composition, comprising a mixture of the following components:
   (a) about 2% to about 25% by weight of a first styrenic block copolymer, based on the total adhesive composition, comprising a styrene-butadiene-styrene block polymer having a styrene content greater than 35% by weight and up to about 50% by weight and a styrene-butadiene diblock content greater than 30% by weight and less than 70% by weight;
   (b) about 2% to about 25% by weight of a second styrenic block copolymer, based on the total adhesive composition, comprising a styrene-isoprene-styrene block copolymer or a styrene-butadiene/isoprene-styrene block copolymer, each said block copolymer having a styrene content from 15% to 30% by weight and a styrene-isoprene or styrene-butadiene/isoprene diblock content present in the second styrenic block copolymer and lower than the first styrenic block copolymer and less than 40% by weight;
   (c) about 25% to about 60% by weight of a tackifying resin, based on the total adhesive composition, said tackifying resin present in an amount greater than the combined amount of the first and second styrenic block copolymers and having a Ring and Ball softening point of at least 115° C.;
   (d) about 0% to about 15% by weight of an aromatic endblock reinforcing resin based on the total adhesive composition;
   (e) a liquid plasticizer in an amount of greater than 25% to about 50% by weight based on the total adhesive composition; and
   (f) about 0% to about 5% by weight of a stabilizer or antioxidant based on the total adhesive composition.

2. The hot melt adhesive composition of claim 1 wherein the styrene-butadiene diblock content of said first styrenic block copolymer is greater than 45% by weight.

3. The hot melt adhesive composition of claim 1 wherein the styrene-butadiene diblock content of said first styrenic block copolymer is greater than 60% by weight.

4. The hot melt adhesive composition of claim 1 wherein said first styrenic block copolymer is present in an amount of from about 5% to about 20% by weight based on the total adhesive composition.

5. The hot melt adhesive composition of claim 1 wherein said first styrenic block copolymer is present in an amount of from about 8% to about 16% by weight based on the total adhesive composition.

6. The hot melt adhesive composition of claim 1 wherein said second styrenic block copolymer has styrene content from 15% to 25% by weight.

7. The hot melt adhesive composition of claim 1 wherein said second styrenic block copolymer has styrene content from 15% to 20% by weight.

8. The hot melt adhesive composition of claim 1 wherein the styrene-isoprene or styrene-butadiene/isoprene diblock content of said second styrenic block copolymer is less than 30% by weight.

9. The hot melt adhesive composition of claim 1 wherein said second styrenic block copolymer is present in an amount of from about 5% to about 20% by weight based on the total adhesive composition.

10. The hot melt adhesive composition of claim 1 wherein said second styrenic block copolymer is present in an amount of from about 8% to about 16% by weight based on the total adhesive composition.

11. The hot melt adhesive composition of claim 1, wherein said second styrenic block copolymer is the styrene-isoprene-styrene polymer.

12. The hot melt adhesive composition of claim 1 wherein said plasticizer is present in an amount of from greater than 25% to about 45% by weight based on the total adhesive composition.

13. The hot melt adhesive composition of claim 1 wherein said plasticizer is present in an amount of from greater than 25% to about 40% by weight based on the total adhesive composition.

14. The hot melt adhesive composition of claim 1 wherein said composition has a glass transition temperature at or below about 15° C.

15. The hot melt adhesive composition of claim 1 wherein said first styrenic block copolymer has a solution viscosity (25% by weight in toluene) less than about 500 centipoise.

16. The hot melt adhesive composition of claim 1 wherein said first styrenic block copolymer has a solution viscosity (25% by weight in toluene) less than about 400 centipoise.

17. The hot melt adhesive composition of claim 1 wherein said first styrenic block copolymer has a solution viscosity (25% by weight in toluene) less than about 200 centipoise.

18. The hot melt adhesive composition of claim 1 wherein the triblock of said second styrenic block copolymer consists of a styrene-isoprene-styrene polymer.

19. The hot melt adhesive composition of claim 1, wherein the amount of liquid plasticizer is at least 32% by weight based on the total adhesive composition.

20. The hot melt adhesive composition of claim 1, wherein the amount of liquid plasticizer is at least 32.6% by weight based on the total adhesive composition.

21. The hot melt adhesive composition of claim 1, wherein said first styrenic block copolymer is linear.

22. The hot melt adhesive composition of claim 1, wherein said second styrenic block copolymer is linear.

23. The melt adhesive composition of claim 1, wherein both said first styrenic block copolymer and said second styrenic block copolymer are linear.

24. The melt adhesive composition of claim 1, wherein the Ring and Ball softening point of the tackifying resin is at most 142° C.

25. The melt adhesive composition of claim 24, wherein the Ring and Ball softening point of the tackifying resin is at least 130° C.

* * * * *